United States Patent [19]

Morgan

[11] 4,342,674

[45] Aug. 3, 1982

[54] HIGH SOLIDS COATING FOR RUSTY STEELS

[75] Inventor: Roger E. Morgan, Piscataway, N.J.

[73] Assignee: Mobil Oil Corporation, New York, N.Y.

[21] Appl. No.: 256,431

[22] Filed: Apr. 22, 1981

[51] Int. Cl.³ .............................................. C08L 91/06
[52] U.S. Cl. ................... 523/177; 428/418; 525/510; 525/939; 523/428; 523/456; 523/465; 523/443
[58] Field of Search ................... 260/28.5 C, 30.4 EP, 260/30.4 A; 525/510, 939; 428/418

[56] References Cited

U.S. PATENT DOCUMENTS 4,255,468  3/1981  Olson .......................... 260/30.4 EP

*Primary Examiner*—Theodore E. Pertilla
*Attorney, Agent, or Firm*—C. A. Huggett; H. S. Trigg; G. W. Allen

[57] ABSTRACT

This invention provides a two-component coating composition wherein:

Component A contains a polyglycidyl ether of a bisphenol having an epoxy equivalent weight between about 170 and about 200 diluted with between about 10 weight percent and about 20 weight percent of butyl glycidyl ether; an organic thixotropic agent; a liquid polyglycidyl ether of a bisphenol having an epoxy equivalent weight between about 170 and about 210; a coumarone-indene resin having a softening point between about 40° F. and about 60° F.; a urea-formaldehyde resin; leafing aluminum paste; and 2-nitropropane; and Component B contains a polyamide having a base number between about 300 and about 360; N-oleyl-1,3-propylenediamine oleate; a coumarone-indene resin having a softening point between about 40° F. and about 60° F.; microcrystalline silica; and 2,4,6-tris-(dimethylaminomethyl) phenol.

9 Claims, No Drawings

HIGH SOLIDS COATING FOR RUSTY STEELS

BACKGROUND OF THE INVENTION

1. Field of the Invention

This invention is directed to a two-component epoxy-polyamide based high solids coating composition for rusty steels.

2. Description of the Prior Art

Some alkyds and other oil modified products have been formulated for application over rusty steel, but these products will not withstand exposure in a heavy industrial environment. Insofar as is now known, the composition of this invention has not been proposed.

SUMMARY OF THE INVENTION

This invention provides a two-component coating composition wherein:

Component A contains a polyglycidyl ether of a bisphenol having an epoxy equivalent weight between about 170 and about 200 diluted with between about 10 weight percent and about 20 weight percent of butyl glycidyl ether; an organic thixotropic agent; a liquid polyglycidyl ether of a bisphenol having an epoxy equivalent weight between about 170 and about 210; a coumarone-indene resin having a softening point between about 40° F. and about 60° F.; a urea-formaldehyde resin; leafing aluminum paste; and 2-nitropropane; and Component B contains a polyamide having a base number between about 300 and about 360; N-oleyl-1,3-propylenediamine oleate; a coumarone-indene resin having a softening point between about 40° F. and about 60° F.; an organic thixotropic agent; microcrystalline silica; and 2,4,6-tris-(dimethylaminomethyl) phenol.

DESCRIPTION OF SPECIFIC EMBODIMENTS

The coating composition of this invention comprises two components, which are mixed just prior to application. When equal volumes of each component are mixed and thinned with aromatic hydrocarbon solvent, pot life is about 3 hours at 15°-21° C. (60°-70° F.) and about 1.5 hours at 27°-32° C. (80°-90° F.).

COMPONENT A

One ingredient in Component A is a polyglycidyl ether of a bisphenol diluted with 10-20% butyl glycidyl ether. The preferred diluted epoxy is diluted diglycidyl ether of bisphenol A (DGEBA), which is readily available commercially. The epoxy equivalent weight is between about 170 and about 200.

Another ingredient is an organic thixotropic agent, such as castor wax which is commercially available at 24% solids in mineral spirits (B.R. about 155°-195° C.).

Another ingredient is a liquid polyglycidyl ether of a bisphenol. The preferred liquid epoxy is a diglycidyl ether of bisphenol A (DGEBA) which is readily available commercially. The epoxy equivalent weight is between about 170 and about 210.

Another ingredient is a coumarone-indene resin, which is commercially available. Preferably, the resin has a softening point between about 40° F. (about 4.4° C.) and about 60° F. (about 15° C.).

Another ingredient is a urea-formaldehyde resin, available commercially. A preferred resin is solution of 50% urea-formaldehyde resin solids in a mixture of 80 volume percent n-butanol and 20 volume percent ethylbenzene.

Another ingredient is leafing aluminum paste, which is readily available commercially. A preferred paste contains about 68 weight percent aluminum flakes admixed with about 32 weight percent of a mixture by volume of 92% aliphatic hydrocarbon (B.R. 150°-180° C.) and 8% aromatic hydrocarbon B.R. 150°-175° C.).

The final ingredient in Component A is 2-nitropropane, which is readily available commercially.

The weight percent of the ingredients in Component A are:

| Ingredient | Wt. % |
| --- | --- |
| DGEBA solution | 8-12 |
| Thixotropic agent | 0.5-1.5 |
| Liquid DGEBA | 48-52 |
| Coumarone-indene | 4-8 |
| Urea-formaldehyde | 1.5-2.5 |
| Leafing aluminum paste | 28-32 |
| 2-Nitropropane | 0.5-1.5 |

COMPONENT B

One ingredient in Component B is a commercially available polyamide resin. A preferred polyamide is prepared from diethylenetriamine and a mixture of 75% dimer fatty acid (linoleic) and 25% trimer fatty acid (linolenic), the resin having a base number between about 300 to about 360.

Another ingredient is N-oleyl-1,3-propylenediamine oleate, which is commercially available.

Another ingredient in Component B is a coumarone-indene resin as described as an ingredient in Component A.

Another ingredient is an organic thixotropic agent as described as an ingredient in Component A.

Another ingredient is microcrystalline silica, which is readily available commercially. A preferred microcrystalline silica has an average particle size of about 8.5 microns.

The final ingredient in Component B is 2,4,6-tris-dimethylaminomethyl) phenol, which is readily commercially available.

The weight percent of ingredients in Component B are:

| Ingredient | Wt. % |
| --- | --- |
| Polyamide resin | 36-40 |
| N-Oleyl-1,3-propylenediamine oleate | 3.5-4.5 |
| Coumarone-indene resin | 5-9 |
| Thixotropic agent | 0.5-1.5 |
| Microcrystalline silica | 48-52 |
| 2,4,6,tris-(dimethylaminomethyl)phenol | 1-1.5 |

COATING FORMULATION

At the time of application, equal volumes of Component A and Component B are mixed and thinned with xylene for application. A preferred formulation contains, by volume, 40 percent Component A, 40 percent Component B, and 20 percent xylene. Prior to mixing each component is pacakaged separately.

The coating composition of this invention is particularly suitable for coating rusty steel surfaces, where sandblasting is prohibited or impractical. The surface can be satisfactorily cleaned using hand or power wire brushing. Typical uses include structures in coastal or industrial environments, bridges deteriorating because of deicing salts, paper machine room applications, and other exposures subject to fume conditions or high humidity or moisture condensation. It also can be used for coating weathered galvanized siding, roofing, and fencing. The composition is self-priming and can be used as such for general maintenance coating; but, when there is exposure to strongly acidic or alkaline environments, the coating should be topcoated with a suitable epoxy, vinyl, chlorinated rubber, or urethane coating.

The preferred method of application is by spraying. Brush or roller application can be used, but brush marks and lap marks will be visible. Application should be sufficient to provide a dry film thickness of 5–7 mils (about 7–9 mils wet). The coating is dry to touch 4 hours after application and tack free in 12–24 hours. A drying time in air of at least 24 hours should be permitted if a topcoat is to be used.

EXAMPLE 1

Component A

In a drum, there was added 104 pounds of diglycidyl ether of bisphenol A, having an epoxy equivalent weight of 175–195, dissolved in 11% butyl glycidyl ether and 6.7 pounds of organic wax (24% solids in mineral spirits)*. This mixture was mixed at high speed with a Hockmeyer mixer for 30 minutes. The mixture was transferred to a mixing vessel and there were added 511.7 pounds of a diglycidyl ether of bisphenol A having an epoxy equivalent weight of 185–192, 62.4 pounds of coumarone-indene resin (softening point about 50° F.), 20.0 pounds urea-formaldehyde resin (50% solids in a mixture 80 volume % n-butanol and 20 volume % ethylbenzene, and 312.0 pounds leafing aluminum paste (68% solids aluminum flakes in mixture with 92% aliphatic hydrocarbon, B.R. 150°–180° C., and 8% aromatic hydrocarbon, B.R. 150°–175° C., by volume). Mixing was continued until the mixture was smooth. Then, 11.2 pounds 2-nitropropane was added and mixing was continued until mixing was uniform. This component contained 87.8 weight percent solids.
*MPA 60, NL Industries

EXAMPLE 2

Component B

In a mixing vessel, there was added 428.9 pounds polyamide resin (diethylenetriamine—75% dimer/25% trimer linoleic acid having a base number of about 330), 50.0 pounds N-oleyl-13,-propylenediamine oleate, and 76.2 pounds of coumarone-indene resin (softening point about 50° F.). The mixture was mixed at high speed at 15 minutes. Then, there was added 6.8 pounds of organic wax (24% solids in mineral spirits)* and mixing was continued for 30 minutes. Then, was added 571.6 pounds of microcrystalline silica (average particle size 8.5 microns). The resultant mixture was ground to NS-3. When the grind was NS-3, there was added 15.0 pounds of 2,4,6-tris-(dimethylaminomethyl)phenol and mixing was continued for 15 minutes. This component contained 99.85 weight percent solids.
*MPA 60, NL Industries

EXAMPLE 3

Coating Composition

There was mixed 40 volumes of Component A (Example 1), 40 volumes of Component B (Example 2), and 20 volumes of xylene. The resultant composition had a solids content of about 93.9 weight percent and a pot life of about 3 hours at 70° F. It set in air, after application, to touch after 4 hours and hard after 24 hours.

STABILITY TEST

Because of its high metallic aluminum content, pint can samples of Component A (Example 1) were tested for stability. Samples were placed in a hot box at 120° F. and observed periodically for bulging. After 3.5 months, no bulging was noted. The cans were then opened and only a very slight hiss was noted when the cans were opened. No gelation or thickening was observed.

EXTERIOR EXPOSURE

Sandblasted steel 4"×12" panels were placed on the roof and allowed to rust for about 2 months. Upon removal, the panels were wirebrushed to remove loose corrosion and solvent washed with MEK. The panels were coated with the thinned mixture of Example 3 to a dry film thickness of 5 mils. After drying for 24 hours, the panels were exposed in the exterior at a 45° angle facing south for 3 months. There was a slight dulling of the bright aluminum surface, but no other physical failure was detected. Very good adhesion was noted.

CLEVELAND CONDENSING HUMIDITY TEST

This test was carried out in the manner prescribed by Ford Test Method BI 4-2 Procedure of the Ford Motor Company, one of a series of test methods well known to the art. Wirebrushed rusty steel panels coated to a dry film thickness of 5 mils with the thinned mixture of Example 3 and dried in air 24 hours were exposed to a high humidity atmosphere at 43° C. for 500 hours. The exposed surface had been dulled after exposure and leafing was no longer noted on the surface in the exposed area. No blistering or other failure was detected.

SALT SPRAY RESISTANCE

Wirebrushed rusty steel panels containing areas coated with aged alkyd coating were topcoated at 5 mils dry film thickness with the thinned mixture of Example 3 and dried 24 hours in air. The coated panels were subjected to the salt spray test for 2,000 hours. After this exposure, there were scattered #4 blisters front and backside and corrosion at the scribe.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A two-component coating composition wherein: Component A contains a polyglycidyl ether of a bisphenol having an epoxy equivalent weight between about 170 and about 200 diluted with between about 10 weight percent and about 20 weight percent of butyl glycidyl ether; an organic wax; a liquid polyglycidyl ether of a bisphenol having an epoxy equivalent weight between about 170 and about 210; a coumarone-indene resin having a softening point between about 40° F. and about 60° F.; a urea-formaldehyde resin; leafing aluminum paste; and 2-nitropropane; and Component B contains a polyamide having a base number between about 300 and about 360; N-oleyl-1,3-propylenediamine oleate; a coumarone-indene resin having a softening point between about 40° F. and about 60° F.; an organic wax; microcrystalline silica; and 2,4,6-tris-(dimethylaminomethyl) phenol.

2. The coating composition of claim 1, wherein the weight percent of the ingredients in Component A are:

| Ingredient | Wt. % |
| --- | --- |
| DGEBA solution | 8–12 |
| [Thixotropic agent]Organic wax | 0.5–1.5 |
| Liquid DGEBA | 48–52 |
| Coumarone-indene | 4–8 |
| Urea-formaldehyde | 1.5–2.5 |
| Leafing aluminum paste | 28–32 |
| 2-Nitropropane | 0.5–1.5 | and the weight percent of ingredients in Component B are:

| Ingredient | Wt. % |
| --- | --- |
| Polyamide resin | 36–40 |
| N-Oleyl-1,3-propylenediamine oleate | 3.5–4.5 |
| Coumarone-indene resin | 5–9 |
| [Thixotropic agent]Organic wax | 0.5–1.5 |
| Microcrystalline silica | 48–52 |
| 2,4,6,tris-(dimethylaminomethyl)phenol | 1–1.5 |

3. The coating composition of claim 2, wherein in Component A said DGEBA solution is a solution of diglycidyl ether of bisphenol A, having an epoxy equivalent weight of 175–195, dissolved in 11% butyl glycidyl ether; said organic wax is employed at 24% solids in mineral spirits; said liquid DGEBA is a diglycidyl ether of bisphenol A having an epoxy equivalent weight of 185–192; said coumarone-indene resin has a softening point of about 50° F.; said urea-formaldehyde resin is at least 50% solids in a mixture of 80 volume % n-butanol and 20 volume % ethylbenzene; and said leafing aluminum is 68% solids aluminum flakes in mixture with 92 volume % aliphatic hydrocarbon boiling at 150°–180° C. and 8 volume % aromatic hydrocarbon boiling at 150°–175° C. and wherein in Component B said polyamide resin is a diethylenetriamine-75% dimer/25% trimer linoleic acid resin having a base number of about 330; said coumarone-indene resin has a softening point of about 50° C.; said organic wax is employed at 24% solids in mineral spirits; and said microcrystalline silica has an average particle size of 8.5 microns.

4. A composition ready for application to a rusty steel substrate containing about 40 volume % of Component A of claim 1, about 40 volume % of Component B of claim 1, and about 20 volume % of xylene.

5. A composition ready for application to a rusty steel substrate containing about 40 volume % of Component A of claim 2, about 40 volume % of Component B of claim 2, and about 20 volume % of xylene.

6. A composition ready for application to a rusty steel substrate containing about 40 volume % of Component A of claim 3, about 40 volume % of Component B of claim 3, and about 20 volume % of xylene.

7. A wirebrushed rusty steel substrate coated with the composition of claim 4.

8. A wirebrushed rusty steel substrate coated with the composition of claim 5.

9. A wirebrushed rusty steel substrate coated with the composition of claim 6.

* * * * *